(12) United States Patent
Konopa

(10) Patent No.: US 7,587,855 B2
(45) Date of Patent: Sep. 15, 2009

(54) FISHING LURE CASE

(76) Inventor: Robert A. Konopa, 5321 Cove South Dr., Lakeland, FL (US) 33809

( * ) Notice: Subject to any disclaimer, the term of this patent is extended or adjusted under 35 U.S.C. 154(b) by 0 days.

(21) Appl. No.: 11/873,098

(22) Filed: Oct. 16, 2007

(65) Prior Publication Data

US 2009/0094881 A1   Apr. 16, 2009

(51) Int. Cl.
*A01K 97/06* (2006.01)
(52) U.S. Cl. .......................... 43/25.2; 43/57.1
(58) Field of Classification Search ................. 43/25.2, 43/57.1
See application file for complete search history.

(56) References Cited

U.S. PATENT DOCUMENTS

| | | | | | |
|---|---|---|---|---|---|
| 2,767,502 | A | * | 10/1956 | Reynolds | 43/25.2 |
| 3,086,312 | A | * | 4/1963 | Davis | 43/25.2 |
| D219,973 | S | * | 2/1971 | Sather | 43/57.1 |
| 4,015,361 | A | * | 4/1977 | O'Reilly et al. | 43/25.2 |
| 4,216,604 | A | * | 8/1980 | Starke | 43/25.2 |
| 4,383,385 | A | * | 5/1983 | Myers | 43/57.1 |
| 4,441,274 | A | * | 4/1984 | Masur | 43/25.2 |
| 4,452,003 | A | * | 6/1984 | Deutsch et al. | 43/25.2 |
| 4,681,220 | A | * | 7/1987 | Beneke | 43/25.2 |
| 4,700,502 | A | * | 10/1987 | McFarland et al. | 43/57.1 |
| 4,756,412 | A | * | 7/1988 | Graves et al. | 43/57.1 |
| 4,757,637 | A | * | 7/1988 | Christensen | 43/57.1 |
| 4,884,357 | A | * | 12/1989 | Clifford | 43/25.2 |
| 4,920,683 | A | * | 5/1990 | Weber | 43/25.2 |
| 4,936,040 | A | * | 6/1990 | Reiter et al. | 43/25.2 |
| 5,123,199 | A | * | 6/1992 | Lysohir et al. | 43/57.1 |
| 5,199,208 | A | * | 4/1993 | Matchette | 43/25.2 |
| 5,235,775 | A | * | 8/1993 | Daughtry | 43/25.2 |
| 5,475,942 | A | * | 12/1995 | Tatum | 43/25.2 |
| 5,515,640 | A | * | 5/1996 | Cosby et al. | 43/25.2 |
| 5,517,783 | A | * | 5/1996 | Edgar | 43/57.1 |
| 5,588,245 | A | * | 12/1996 | Vance | 43/25.2 |
| 6,023,876 | A | * | 2/2000 | Haddad et al. | 43/25.2 |
| 6,085,455 | A | * | 7/2000 | Bracken et al. | 43/25.2 |
| 6,301,825 | B1 | * | 10/2001 | Doreian | 43/25.2 |
| 6,606,814 | B1 | * | 8/2003 | Weaver | 43/25.2 |
| 6,711,847 | B1 | * | 3/2004 | Udelhoven | 43/25.2 |
| 6,857,219 | B2 | * | 2/2005 | Jang | 43/25.2 |

(Continued)

FOREIGN PATENT DOCUMENTS

DE    19912302 C1 * 8/2000

(Continued)

*Primary Examiner*—Darren W Ark
(74) *Attorney, Agent, or Firm*—McKinney Law, PLLC

(57) ABSTRACT

The fishing lure case has a first half and a matching second half that form a cylindrical housing when in a closed position. A hinge is disposed on a lower edge of the case that serves to connect parallel longitudinal edges of the first half and the second half about which the case can be opened. A first arcuate flange extends from the first end of the first half and a matching second arcuate flange extends from the first end of the second half. Therefore, as the first half and the second half of the case are rotated about the hinge, the arcuate flanges encircle the fishing line so that the fishing line is secured and protected within the aperture. A plurality of ventilation apertures are disposed about the fishing lure case to allow air to circulate within the case and water to drain out.

14 Claims, 4 Drawing Sheets

U.S. PATENT DOCUMENTS

| | | | |
|---|---|---|---|
| 7,069,687 B2 * | 7/2006 | Jang | 43/25.2 |
| 7,299,582 B1 * | 11/2007 | Whitehead | 43/25.2 |
| 2004/0250462 A1 * | 12/2004 | Trebil | 43/25.2 |
| 2005/0091906 A1 * | 5/2005 | D'Alusio | 43/25.2 |
| 2005/0160657 A1 * | 7/2005 | Dodge | 43/25.2 |
| 2005/0178042 A1 * | 8/2005 | Dodge | 43/25.2 |
| 2007/0157505 A1 * | 7/2007 | Dodge | 43/25.2 |

FOREIGN PATENT DOCUMENTS

| | | | |
|---|---|---|---|
| FR | 2587880 A1 | * | 4/1987 |
| JP | 10327729 A | * | 12/1998 |
| JP | 11318301 A | * | 11/1999 |
| JP | 2001112393 A | * | 4/2001 |
| JP | 2002125556 A | * | 5/2002 |
| JP | 2002171885 A | * | 6/2002 |
| JP | 2004024222 A | * | 1/2004 |

* cited by examiner

FISHING LURE CASE

FIELD OF THE INVENTION

The present invention relates to fishing equipment, and more particularly to an improved case for protecting a fishing lure or live bait that is attached to a fishing line.

DESCRIPTION OF THE PRIOR ART

Artificial fishing lures are used by fisherman to test their skills at catching fish by imitating live bait. A fishing lure typically has the shape and coloring of live bait with the addition of multiple sharp hooks appending from a lower surface. The hooks, while effective at retaining a fish on the line, also are susceptible to, among other things, snagging carpeting, other fishing poles or lines, while in transit or storage.

There have been attempts to protect a fishing lure in storage through the use of cases. Typically, the lure is placed in the case and snapped shut. The shortcoming of that type of case is that the line is able to slide between the linear gap formed in the top of the case when snapped shut. The fishing line can be rubbed and nicked by this gap causing failure the next time the fishing line is placed under a load. Accordingly, what is needed in the art is a fishing lure case that protects the hooks, but also does not expose the fishing line to potential damage at its most vulnerable location.

Another shortcoming of the prior art is the inability of the case to properly ventilate and remain dry when in storage. This reduces the life of a fishing lure and its hooks as they are exposed to constant dampness that can lead to rust and fatigue over time.

Accordingly, there is a need in the art for a novel, non-obvious and improved fishing lure case that reduces the damage to the lure fishing line when being stored while keeping the lure relatively dry and well ventilated.

Notwithstanding the existence of prior art fishing lure cases, there is a need for an improved fishing lure case. It is, therefore, to the effective resolution of the aforementioned problems and shortcomings of the prior art that the present invention is directed. However, in view of the prior art at the time the present invention was made, it was not obvious to those of ordinary skill in the pertinent art how the identified needs could be fulfilled.

SUMMARY OF THE INVENTION

The fishing lure case of the present invention includes a first half and a matching second half that form a cylindrical housing when in a closed position. A hinge is disposed on a lower edge of the case that serves to connect parallel longitudinal edges of the first half and the second half about which the case can be opened. When rotated to come together, the first half and the second half form an aperture disposed concentrically on the first end of the case when the case is in a closed position. A first arcuate flange extends from the first end of the first half and a matching second arcuate flange extends from the first end of the second half. Therefore, as the first half and the second half of the case are rotated about the hinge, the arcuate flanges encircle the fishing line so that the fishing line is secured and protected within the aperture. An interlocking clasp is located on an upper edge of the case that secures the first half and second half in a closed position. In the preferred embodiment, a plurality of ventilation apertures are disposed about the fishing lure case to allow air to circulate within the case and water to drain out.

It is therefore an object of the present invention to provide for an improvement that overcomes the aforementioned inadequacies of the prior art and provides a significant contribution to the advancement of fishing lure cases.

Both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
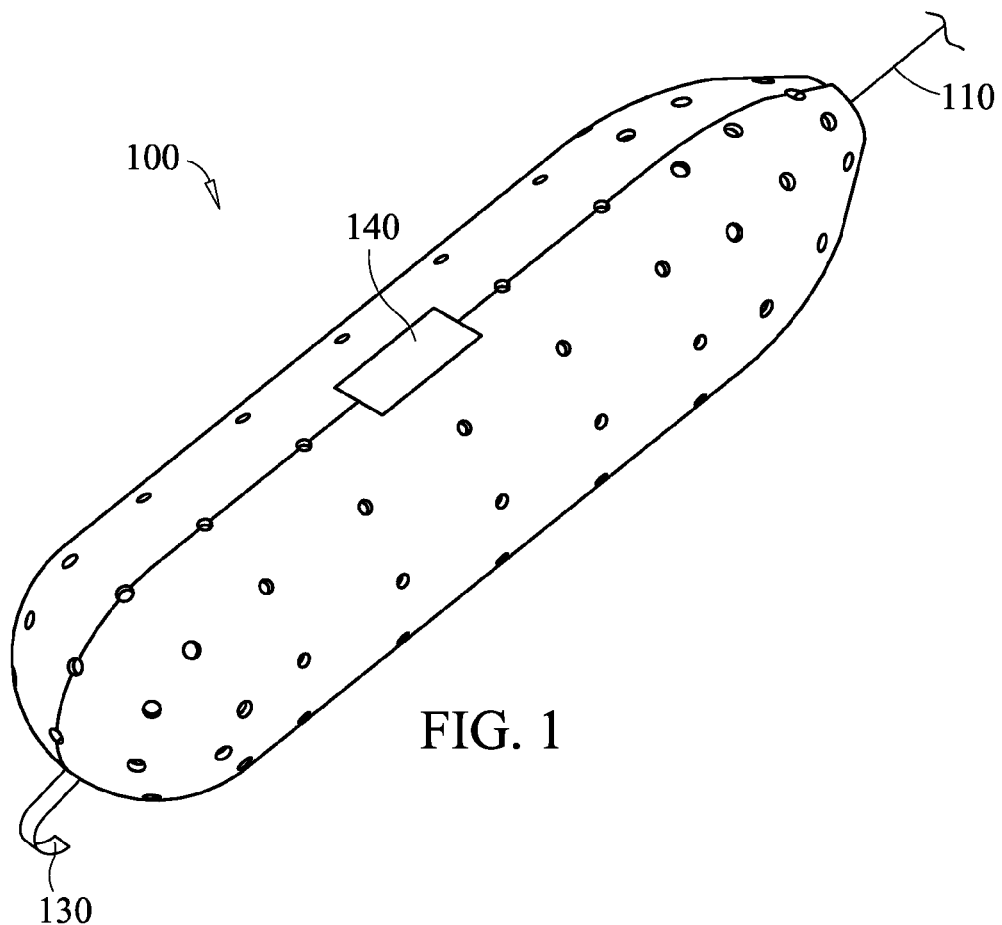
FIG. 1 is a perspective view of the fishing lure and bait case in accordance with an embodiment of the present invention.

As shown in FIG. 1, case 100 is cylindrical in shape and forms an interior cavity when case 100 is in a closed position. An aperture is disposed at a first end of case 100, which allows fishing line 110 to enter case 100 and attach to fishing lure stored within the cavity of case 100. A J-shaped hook 130 is located at an opposing second end of case 100 that is used to secure case 100 to a fishing reel protrusion or fishing rod eyelet, for example. Once case 100 is secured using J-shaped hook 130, winding the fishing reel tensions fishing line 110 and the lure is firmly held within case 100. Clasp 140 secures case 100 in a closed position. In an alternative embodiment, case 100 includes a strap for securing case to a fishing rod (not shown).

Figure 2:
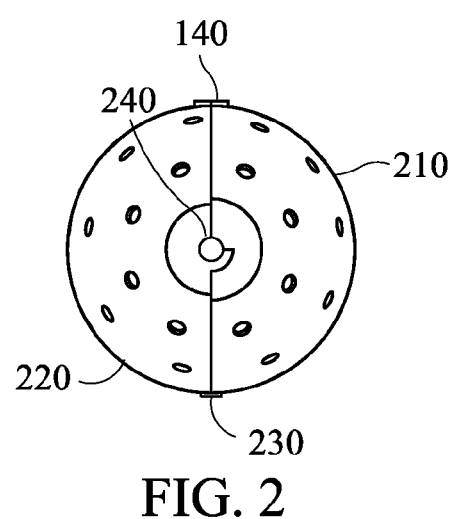
FIG. 2 is a top view of the fishing lure and bait case in accordance with an embodiment of the present invention.

Referring now to FIG. 2 shows a top view of case 100 in a closed position. Hinge 230 is disposed on a lower edge of case 100 that connects parallel longitudinal edges of first half 210 and second half 220 about which case 100 can be opened. When rotated together, first half 210 and second half 220 form an aperture 240 disposed concentrically on the first end of case 100 so that fishing line 110 can pass into the cavity of case 100 when case 100 is in a closed position. Interlocking clasp 140 includes a slot disposed on the upper longitudinal edge of first half 210 for receiving a complementary tab disposed on the upper longitudinal edge of second half 220 so that first half 210 and second half 220 couple together in a closed position.

Figure 3:
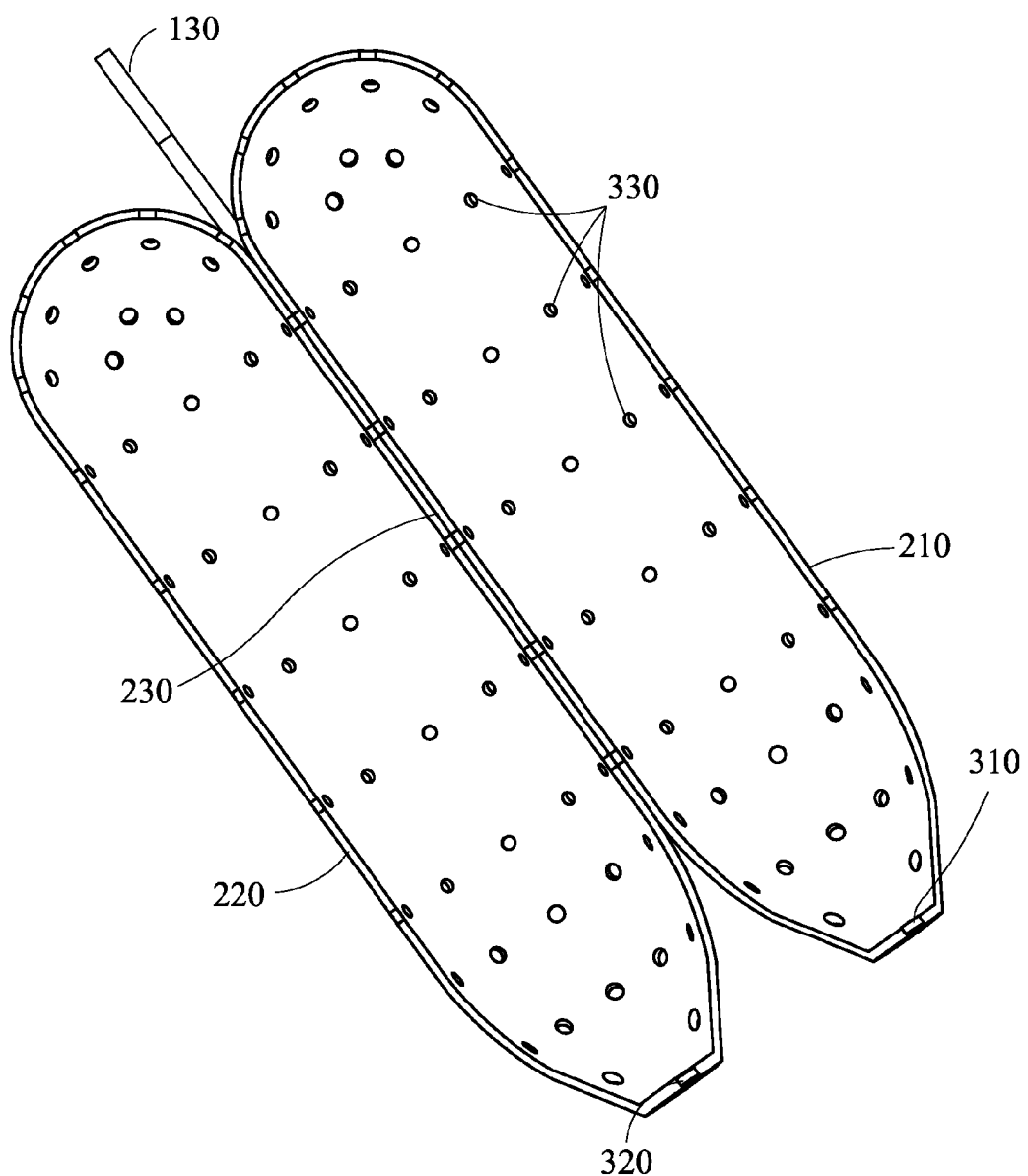
FIG. 3 is a side perspective view of the fishing lure and bait case opened in accordance with an embodiment of the present invention.

Fishing lure and bait case 100 is shown in an open position in FIG. 3 so that the cavity formed by first half 210 and second half 220 can be readily observed. Interlocking clasp 140 is not shown in FIG. 3 for clarity. First half 210 and second half 220 each include a pair of opposing semicircular ends that form the circular first end and the bulbous circular second end of case 100 when in a closed position. A first arcuate flange 310 extends from first half 210 from its first end face 215 of case 100 in a cantilevered manner. A matching second arcuate flange 320 extends from second half 220 from its first end face 225 of case 100 in a cantilevered manner. Accordingly, when first half 210 and second half 220 are rotated about hinge 230, an overlapping aperture 240 is formed.

Figure 4:
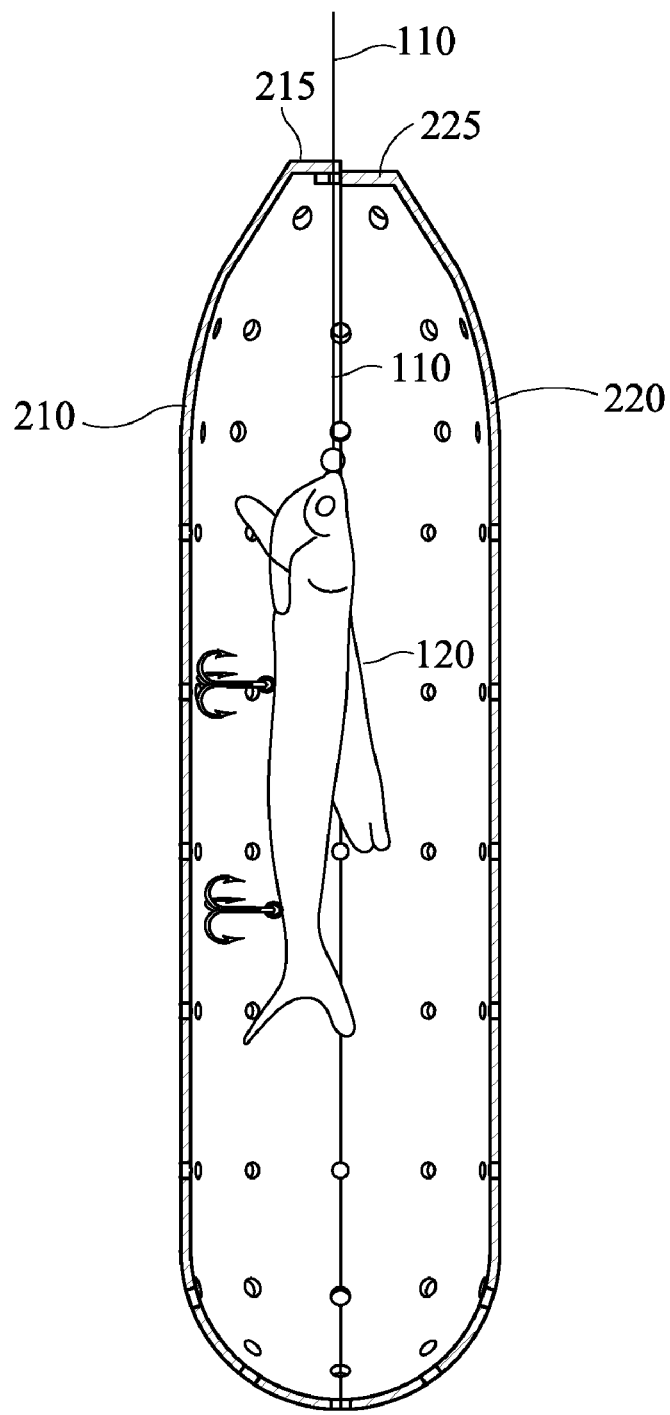
FIG. 4 is a partial cross sectional view of the fishing lure and bait case in accordance with an embodiment of the present invention.

Referring now to FIG. 4, in use fishing lure 120 (or live bait) is attached to the proximate end of fishing line 110. Next, lure 120 is placed within first half 210 and fishing line 110 is placed in alignment within first arcuate flange 310 with the distal end of fishing line extending away from first half 210. As second half 220 is rotated about hinge 230, second arcuate flange 320 encircles fishing line 110 and slides under first half 210 until the upper edge of parallel longitudinal edges of first half 210 and second half 220 abut one another. Fishing line 110 is secured and protected within aperture 240 from sliding into the linear gap formed in first end of case 100 when first half 210 and second half 220 are in a closed position.

Figure 5:
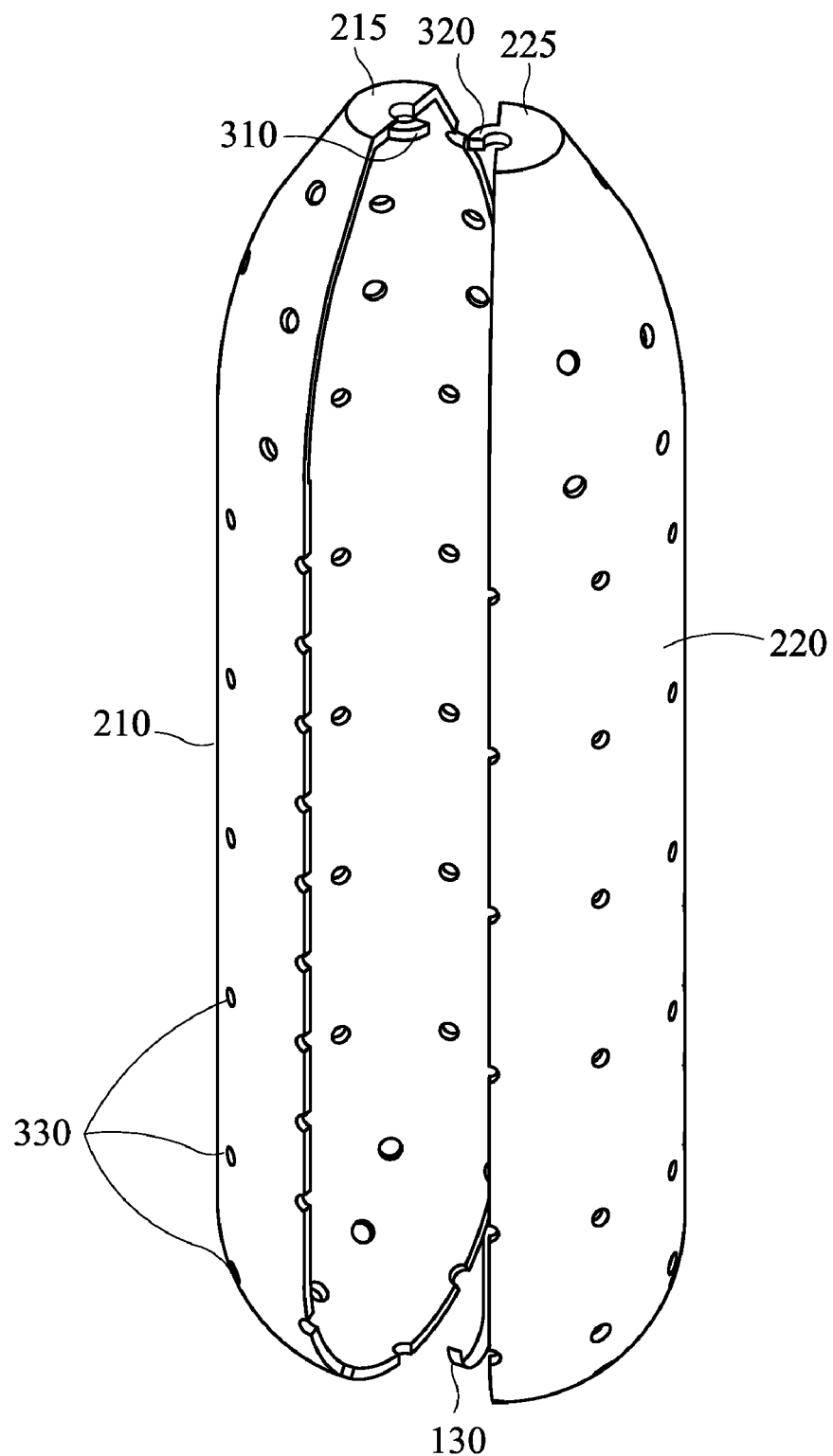
FIG. 5 is a front perspective view of the fishing lure and bait case in accordance with an embodiment of the present invention.

FIG. 5 shows case 100 in a slightly open position. A plurality of ventilation apertures 330 are disposed about first half 210 and second half 220. Ventilation apertures allow air to circulate within case 100 and water to drain out. Further, in an alternative embodiment case 100 can be immersed in fluid (e.g., a live well) when using live bait such as minnows while leaving the live bait on fishing line 110. Water can easily circulate within the case to the live bait. This helps to keep the live bait fresh on the line and consequently reduces stress on the bait and increases the effectiveness of the live bait. Case 100 is also effective when using grasshoppers or other live bait that are not required to be immersed in water but require sufficient air ventilation. Interlocking clasp 140 is not shown in FIG. 5 for clarity.

The particular embodiments disclosed above and in the drawings are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall therebetween.

Now that the invention has been described,
What is claimed is:

1. A fishing lure case, comprising:
   a first half and a second half that form a cylindrical housing having an internal cavity therein when in a closed position, the cylindrical housing having a first end and an opposing second end;
   a first semi-circular end face of the first half at the first end of the cylindrical housing;
   an opposing second semi-circular end face of the second half at the first end of the cylindrical housing;
   a first arcuate flange extending from the first semi-circular end face in a cantilevered manner;
   a second arcuate flange extending from the second semi-circular end face in a cantilevered manner, wherein the second arcuate flange slides under the first arcuate flange when the case is in the closed position;
   an overlapping aperture formed by the first arcuate flange and the second arcuate flange when the case is in the closed position; and
   a hook disposed at the opposing second end of the cylindrical housing so that the case is removably securable to a fishing reel protrusion or fishing rod eyelet.

2. The fishing lure case of claim 1 further comprising an interlocking clasp located on an upper edge of the case that secures the first half and second half in a closed position.

3. The fishing lure case of claim 2 further comprising a plurality of ventilation apertures disposed about the first half and the second half so that air can circulate within the case and water to drain out.

4. The fishing lure case of claim 3 further comprising the hook being a J-shaped hook.

5. The fishing lure case of claim 4, wherein the interlocking clasp having a slot disposed on an upper longitudinal edge of the first half for receiving a complementary tab disposed on an upper longitudinal edge of the second half.

6. The fishing lure case of claim 5, wherein the first end face and second end face are offset from each other.

7. A fishing lure case, comprising:
   a first half and a second half having an internal cavity therein when the case is in a closed position, said case having a first end and an opposing second end;
   a hinge disposed on a lower edge of the case configured to connect parallel longitudinal lower edges of the first half and the second half about which the case can be opened and closed;
   a first end face of the first half at the first end of the case;
   a second end face of the second half at the first end of the case;
   a first arcuate flange extending from the first end face in a cantilevered manner;
   a second arcuate flange extending from the second end face in a cantilevered manner;
   wherein the second arcuate flange slides partially under the first arcuate flange when the case is in the closed position;
   an overlapping aperture formed by the first end face and the second end face when the case is in the closed position;
   an interlocking clasp located on an upper edge of the case that secures the first half and second half in the closed position;
   a plurality of ventilation apertures disposed about the first half and the second half so that air can circulate within the case and water to drain out; and
   a hook disposed at the opposing second end of the case to removably secure the case to a fishing reel protrusion or fishing rod eyelet.

8. The fishing lure case of claim 7, wherein the interlocking clasp having a slot disposed on an upper longitudinal edge of the first half for receiving a complementary tab disposed on an upper longitudinal edge of the second half.

9. The fishing lure case of claim 7, wherein the first end face and second end face are offset from each other.

10. A fishing lure case, comprising:
    a first half and a matching second half that form a cylindrical housing having an internal cavity therein when the case is in a closed position, said cylindrical housing having a first end and an opposing second end;

a hinge disposed on a lower edge of the case connecting opposing parallel longitudinal lower edges of the first half and the second half about which the case can be opened and closed;

a first semi-circular end face of the first half at the first end of the cylindrical housing;

an opposing second semi-circular end face of the second half at the first end of the cylindrical housing;

a first arcuate flange extending from the first semi-circular end face in a cantilevered manner;

a second arcuate flange extending from the second semi-circular end face in a cantilevered manner, wherein the second arcuate flange slides under the first arcuate flange when the case is in the closed position;

an overlapping aperture formed by the first arcuate flange and the second arcuate flange when the case is in the closed position;

an interlocking clasp located on an upper edge of the case that secures the first half and second half in the closed position; and a hook disposed at the opposing second end of the cylindrical housing to removably secure the case to a fishing reel protrusion or fishing rod eyelet.

11. The fishing lure case of claim 10 further comprising a plurality of ventilation apertures disposed about the first half and the second half so that air can circulate within the case and water to drain out.

12. The fishing lure case of claim 11 further comprising the hook being a J-shaped hook.

13. The fishing lure case of claim 10, wherein the interlocking clasp having a slot disposed on an upper longitudinal edge of the first half for receiving a complementary tab disposed on an upper longitudinal edge of the second half.

14. The fishing lure case of claim 10, wherein the first end face and second end face are offset from each other.

* * * * *